A. B. SHEAFFER.
Tire Tightener.
No. 101,053.
Patented March 22, 1870.
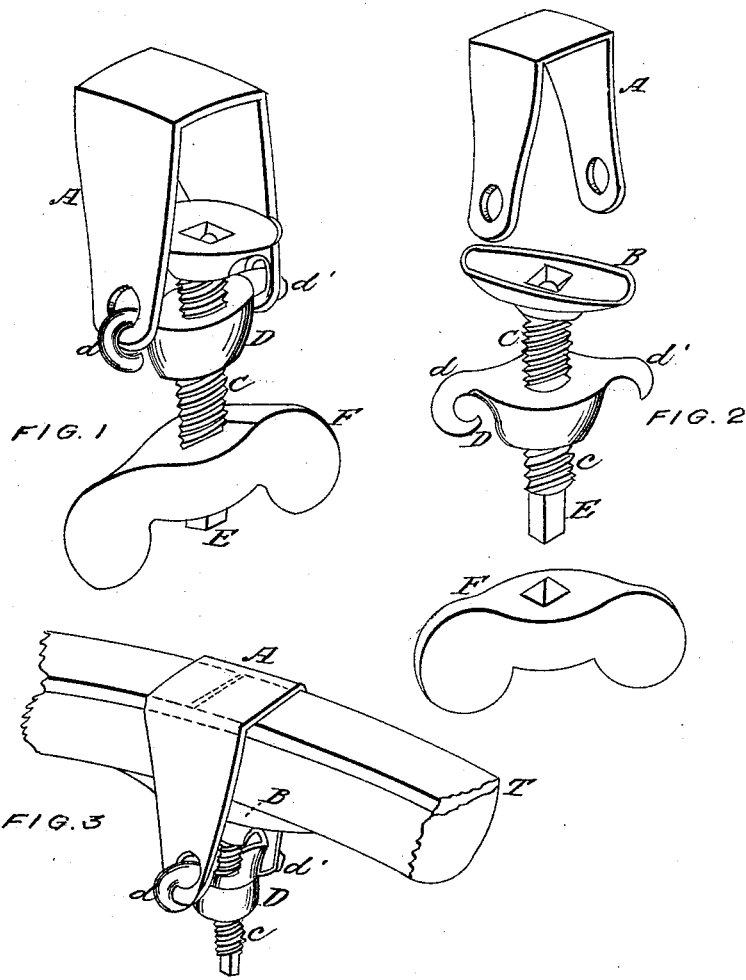
WITNESSES:
INVENTOR:
Alfred B. Sheaffer

United States Patent Office.

ALFRED B. SHEAFFER, OF EPHRATA, PENNSYLVANIA, ASSIGNOR TO HIMSELF, AND JOHN WALTER, OF SAME PLACE.

Letters Patent No. 101,053, dated March 22, 1870.

IMPROVED HAND-SCREW AND CLIP FOR SPLICING BROKEN CARRIAGE-TIRES

The Schedule referred to in these Letters Patent and making part of the same.

I, ALFRED B. SHEAFFER, of Ephrata, in the county of Lancaster and State of Pennsylvania, have invented a certain Combined Hand-Screw and Clip for Splicing Broken Tire on the Wheels of Vehicles, of which the following is a specification.

The nature of my invention consists in providing a means to splice a broken tire when remote from a smith-shop without the use of any other tool, which is easily applied without delay, and will firmly secure the wheel from further injury while pursuing a journey.

The drawings clearly show the combination and arrangement of the parts of the device as a whole, and mode of application.

Figure 1 is a perspective view of the device connected.

Figure 2 shows the several parts detached.

Figure 3, the application of the same over a broken tire, shown in part with a portion of the wheel of a vehicle.

A is the clip with its pendent sides, having openings as shown.

B is a bottom plate, which comes under the felloe between the sides of the clip A.

A screw, C, supports the pad or foot-plate B. This screw has a square end, E, for a thumb-wrench, F, by which it is turned within the nut D.

Said nut is provided with a thread to match the screw; also, with a hook, d, and horn d' above.

One side of the clip may be permanently connected with the hook d, that is, jointed to it by the eye and hook, with sufficient play to turn the clip back.

Provided with this device—designed to be put on sale—in case a tire cracks, as frequently happens in stony roads, the evil is speedily remedied by simply slipping the top band of the clip across the ruptured tire, bringing the plate B or iron pad under the felloe. Hook the other eye of the clip over the horn d', and with the thumb-wrench the pad B and clip A can be made to embrace the wheel and broken tire firmly.

The thumb-wrench can be carried in the pocket, or, with a clip, always left in the carriage-box. Thus a person is enabled to pursue his journey, and when time and opportunity offers, make the permanent repair, when the same device will answer for a similar emergency.

The wrench F may be affixed to the screw or loose, as shown.

I am not aware that a portable device applicable in the manner contemplated or set forth was ever in use.

What I claim as my invention is—

The combination of the clip A, pad B, screw c, hooked nut D, arranged substantially in the manner and for the purpose specified.

ALFRED B. SHEAFFER.

Witnesses:
MARY SELTZER,
WM. K. SELTZER.